United States Patent [19]

Aubert et al.

[11] Patent Number: 4,764,336
[45] Date of Patent: Aug. 16, 1988

[54] BASIN, IN PARTICULAR A DE-ACTIVATION POOL OF A NUCLEAR STATION

[75] Inventors: François Aubert; Jean Dussart, both of Marseille, France

[73] Assignee: Electricite de France-Service National, Paris, France

[21] Appl. No.: 917,941

[22] PCT Filed: Jan. 21, 1986

[86] PCT No.: PCT/FR86/00016
§ 371 Date: Sep. 22, 1986
§ 102(e) Date: Sep. 22, 1986

[87] PCT Pub. No.: WO86/04448
PCT Pub. Date: Jul. 31, 1986

[30] Foreign Application Priority Data

Jan. 21, 1985 [FR] France ................... 85 00792

[51] Int. Cl.⁴ .............. G21C 19/06; G21C 17/00; G21C 13/08
[52] U.S. Cl. .................. 376/272; 376/245; 376/250; 376/295; 52/221; 52/731
[58] Field of Search .......... 376/272, 293, 295, 245, 376/249, 250, 273, 289, 290, 285; 52/169.6, 730, 731, 732, 221, 173 R; 228/182, 184; 220/85 R

[56] References Cited

U.S. PATENT DOCUMENTS

| | | | |
|---|---|---|---|
| 2,997,141 | 8/1961 | Wetzler | 52/730 |
| 3,852,932 | 12/1974 | Mukoyama et al. | 52/731 |
| 3,859,765 | 1/1975 | Nelsson | 52/731 |
| 4,178,729 | 10/1979 | Jennings | 52/284 |
| 4,319,438 | 3/1982 | Mikajiri | 52/221 |
| 4,458,458 | 7/1984 | Orii | 376/295 |
| 4,627,203 | 12/1986 | Presswalla et al. | 52/221 |

FOREIGN PATENT DOCUMENTS

| | | |
|---|---|---|
| 0828908 | 9/1975 | Belgium . |
| 2312098 | 9/1974 | Fed. Rep. of Germany . |
| 3125211 | 3/1982 | Fed. Rep. of Germany . |
| 1590183 | 5/1970 | France . |
| 2383289 | 10/1978 | France . |
| 0108791 | 6/1985 | Japan .......... 376/295 |

Primary Examiner—Charles T. Jordan
Assistant Examiner—Daniel Wasil
Attorney, Agent, or Firm—Sughrue, Mion, Zinn, Macpeak, and Seas

[57] ABSTRACT

This reservoir is provided with a fluidtight covering of metal sheets (6) welded together by their edges and supported by beams (2) each comprising two section elements (16, 17), and three longitudinal channels. In cross-section, the first and second section elements each have the shape of a U, the second section element being substantially narrower than the first element and being fixed by the edge of its branches (18) to the bottom (19) of the first section element so as to define an inspection channel (20) having a closed cross-section, and two draining channels (21) having an open cross-section. The surface of the bottom of the second section element (17) which faces toward the exterior of the beam, is contained in the same plane as the edges (11) of the branches (22) of the first section element (16) so as to form the bearing surface (14) for two sheets (6) in the region of their weld head (15) which interconnects them.

11 Claims, 2 Drawing Sheets

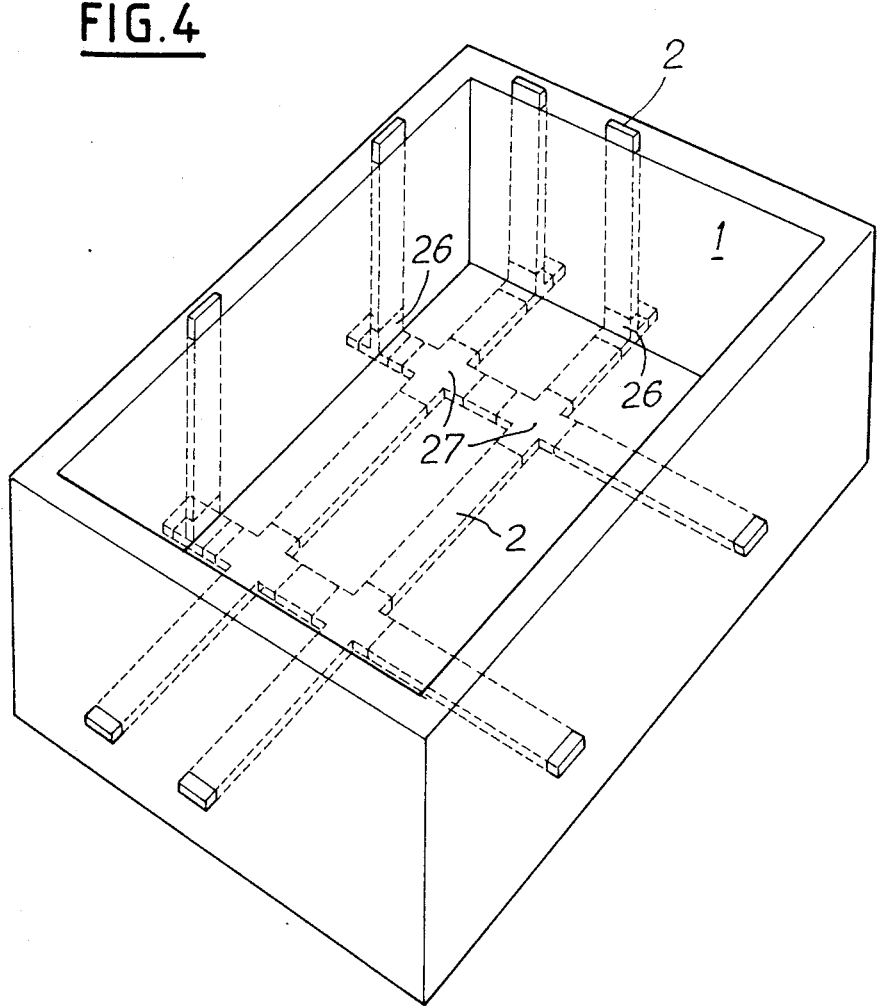

BASIN, IN PARTICULAR A DE-ACTIVATION POOL OF A NUCLEAR STATION

BACKGROUND OF THE INVENTION

The present invention relates to beams for supporting planar elements such as plates or panels and capable, in particular, of supporting the sheets of the fluidtight inner covering of a de-activation pool of a nuclear station.

Nuclear station pools or de-activation pools, are adapted to store substances irradiated after a stay in the reactor and thus permit tne de-activation over a period of time of the substances within a large volume of water which serves to absorb the radiations emitted by said substances so that these radiations are not freely propagated in the atmosphere.

Bearing in mind safety requirements, these pools must be perfectly fluidtight so as to avoid any escape of contaminated water. For this purpose, the de-activation pools comprise a fluidtight inner covering formed by sheets, for example of stainless steel, which are joined to each other by their edges by weld beads. In the region of the latter, the sheets are fixed to a structure formed by beams incorporated in the inner part of the corresponding wall of the pool, which is usually made from concrete, this structure thus supporting said sheets of the inner covering.

The distinction between an outer part and an inner part in respect of each wall results from the manner of constructing the latter which is carried out in two stages, the first stage consisting in making said outer part of the walls.

In this respect, such beams each comprise a flat bearing surface adapted to support the sheets and are connected to the outer part of the corresponding wall of the pool by a plurality of lugs which ensure their fastening to this outer part prior to their embedding in the concrete of the corresponding inner part. These lugs not only ensure the fastening of the beam but also serve to adjust its spacing from the surface of the outer part of the respective wall so as to compensate for unevennesses thereof.

A first type of beam is thus known which comprises a corner iron whose cross-section is substantially L-shaped, one bearing surface for the sheets, whereas the other flange cooperates with the fixing lugs. However, after the filling of the inner part of the walls by concrete, there is no longer any space capable of receiving a device for radiographing the weld beads so as to check their state.

Further, in the event of leakage in the region of said weld beads, the leakage is caused to infiltrate in an uncontrollable manner in the concrete if such a structure does not provide means for draining possible leakages.

In a second type of known beams, the latter each comprise a cross-section in the shape of a U on the edge of the wings of which is welded a flat strip of sheet which forms with said U-section a channel having a closed cross-section and defines a flat bearing surface for the sheets of the inner covering of a pool.

This type of beam provides an improvement in that a channel is formed for the radiography of the welds which is not liable to be obturated when pouring the concrete. However, no solution is provided for the problem relating to the draining of possible leakages.

Thus, in a third type of beam, the latter has a structure similar to those of the second type described before and is provided on its bearing surface with localized openings adapted to receive the liquid coming from leakages in the region of the weld beads. However, it has been found that the localized openings provided in the strip of sheet metal do not provide a very effective draining of the leakage liquid.

SUMMARY OF THE INVENTION

An object of the present invention is to provide a reservoir in which the beams supporting the sheets each define a flat bearing surface for the sheets of the inner covering of a pool while providing a channel which permits the introduction of a radiography apparatus after the beam has been incorporated in the concrete and which is capable of permitting an effective draining of the leakage liquids coming from the weld bead which interconnects the sheets that this beam is adapted to support.

The invention therefore provides a reservoir, in particular a de-activation pool of a nuclear station, whose walls are provided with a fluidtight covering of sheets welded together by their edges by weld beads and supported, under each weld bead, by a beam in the region of a support surface of the beam, each beam being fixed in a corresponding wall of the pool and comprising a section element having a roughly U-shaped cross-section, a planar bearing surface extending longitudinally in facing relation to at least a part of the bottom of the section element and a channel having an open cross-section, characterized in that each beam comprises a member disposed inside the section element, said member defining said bearing surface and at least two longitudinal channels in the inner volume of the beam.

According to other features of the invention:

said bearing surface and the edges of the branches of the section element are contained in a common plane;

the edge of the branches of the section element each have a flange extending in a direction parallel to the bearing surface outwardly of the beam, said flanges completing the bearing surface by their surface facing outwardly of the beam;

the bearing surface is spaced from each of the branches of the section element;

according to a first embodiment, the beam comprises a inspection channel having a closed cross-section and two longitudinal draining channels having an open cross-section;

the branches of the second section element each define a flange so that this second section element has roughly the shape of an omega in cross-section;

according to a second embodiment, the beam comprises two longitudinal channels having an open cross-section and respectively forming a visiting and draining channel, and a draining channel;

the member disposed inside the section element is a second section element which has, in cross-section, roughly the shape of an L one flange of which is fixed in a position perpendicular to the bottom of the first section element whereas the surface of the other flange which is oriented in a direction away from said bottom, forms said bearing surface.

BRIEF DESCRIPTION OF THE DRAWINGS

A better understanding of the invention will be had from the following description of two embodiments which are given solely by way of example with reference to the accompanying drawings, in which:

FIG. 4 is a diagrammatic perspective top view of a de-activation pool of a nuclear station partly illustrating a system of beams according to the invention forming the structure for supporting the metal sheets of its fluidtight inner covering.

DETAILED DESCRIPTION OF THE PREFERRED EMBODIMENTS

The de-activation pool of a nuclear station shown in FIG. 4 comprises a fluidtight inner covering 1 formed by metal sheets, for example of stainless steel, supported in a manner which will be described in more detail hereinafter, by a structure comprising a grid system of beams 2.

Figure 1:
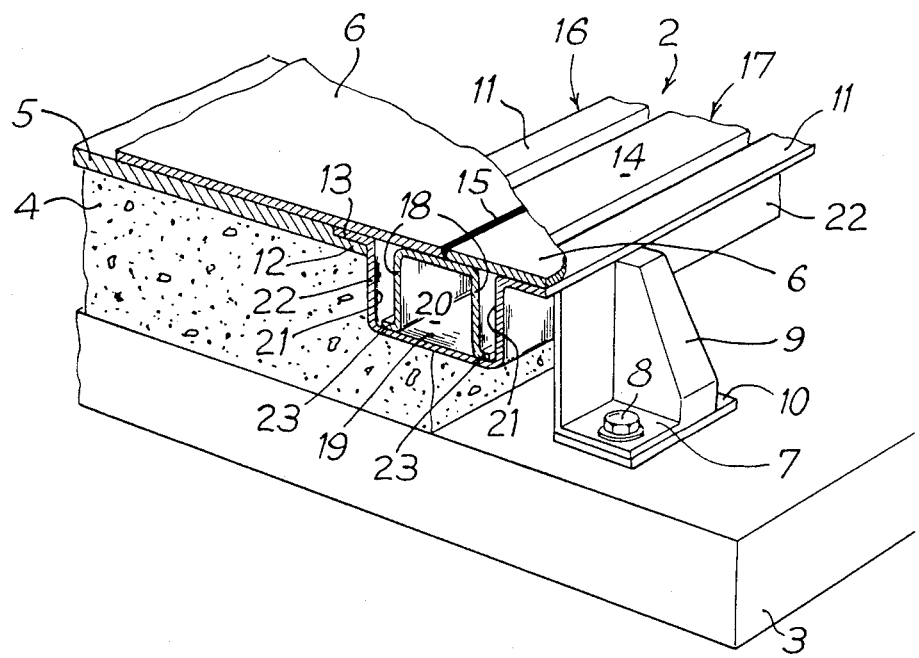
FIG. 1 is a diagrammatic partial perspective sectional view, with a part cut away, of a wall of a de-activation pool whose fluidtight inner covering of metal sheets is supported by a structure of beams according to a first embodiment of the invention.

The walls of this pool have a structure similar to that diagrammatically illustrated in FIG. 1. In the latter, the wall has in succession, from the exterior toward the interior of the pool, an outer part 3 formed from a hard and dense material such as, for example, concrete and defining a roughly planar inner surface, an inner part 4 formed from a hardenable material such as, for example, concrete poured into a space between said outer part 3 and an embedded lining comprising slabs 5 for example of fibrocement disposed in adjoining relation between the beams 2 so as to define with the latter a planar inner surface adapted to receive the metal sheets 6 of the fluidtight inner covering of the pool.

The beams 2 are each fixed, before the pouring of the corresponding inner part, to the outer part of the wall by means of L-shaped fixing lugs 7 disposed on each side of the beam, preferably in an alternating arrangement, one of their branches being welded to the beam and the other being fixed, for example, by means of a bolt 8 screwed into said outer part 3 of the wall. These lugs moreover permit an adjustment of the distance of the beams from the outer part of the wall by compensating for unevennesses of its rough inner surface.

Further, a spacer block 9, for example of rigid plastics material, is provided in contact with each fixing lug 7 on which it is maintained by means of a foil 10 which extends under the lug and the corresponding block.

These blocks 9 each have a planar surface facing the interior of the pool and cooperate with a longitudinal flange 11 of the neighbouring beam extending in facing relation to and a distance from said planar surfaces of the blocks 9 so that a peripheral part 12 of reduced thickness of the slabs 5 can be inserted between the blocks and said flange of the neighbouring beam 2.

The part 12 of reduced thickness of the slabs 5 is defined by a shoulder 13 whose thickness corresponds to that of the flanges 11 and facing toward the interior of the pool so that the inner surfaces of the slabs 5 and the beams 3 are contained in a common plane.

The metal sheets 6 of the fluidtight inner covering of the pool bear on said inner surfaces of the slabs 5 of the lost coffering and of the beams 2.

In this respect, each beam 2 defines a planar bearing surface 14 at the level of which two metal sheets 6 are supported and interconnected by one of their edges by a weld bead 15 which extends longitudinally along the beam 2 and roughly in the middle of the latter, the weld bead being connected to the bearing surface 14 of said beam 2.

According to a first embodiment of the invention, the beam 2 illustrated in FIG. 1 comprises a first section element 16 and a second section element 17 each respectively having a cross-section roughly in the shape of a U and an omega the branches of which are roughly parallel to each other and of the same length.

The first section element 16, incorporated in the concrete of the inner part of the corresponding wall, forms the outer part of the beam on which the lugs 7 are fixed and opens toward the interior of the pool.

The second section element 17 is substantially narrower than the first and is fixed by the edge of each of its branches 18 to the bottom of the latter and thus defines three longitudinal channels.

An inspection channel 20 having a closed cross-section, adapted to receive a device for the radiography of the welds of the sheets 6, is formed between the branches 18 of the second section element 17, and two draining channels 21 having a cross-section which is open toward the interior of the pool are formed on each side of the inspection channel 20 between said branches 18 of the second section element and the branches 22 of the first element 16.

Further, the second section element 17 is fixed by the welding of two flanges 23 provided at the end of each of its branches 18, to the bottom 19 of the first section element 16, said flanges 23 extending outside the inspection channel 20.

Further, the bearing surface 14 for the sheets 6 on the beams 2 is formed at the region of each of the latter by the surface of the intermediate part of the second section element 17 facing toward the interior of the pool, this bearing surface 14 being contained in the same plane as the inner surface of the flanges 11 provided at the end of each of the branches 22 of the first section element 16. This inner surface of the flanges 11 thus advantageously completes the bearing surface 14 by jointly supporting the sheets with the latter.

With reference again to FIG. 4, it can be seen that access may be had to the vertical beams 2 from above the pool and that each of their lower ends is connected to a respective alignment of beams 2 disposed horizontally in the bottom of the pool. This connection may be achieved, as shown in FIG. 4, by means of a hollow T-shaped connector 26 which permits, on one hand, the communication between the channels of each vertical beam and those of the horizontally aligned corresponding beams and, on the other hand, the communication between the channels of the latter and a beam which extends outside the pool if this is possible. This connection may also be ensured by a bent beam, having a cross-section similar to that of the beam 2 described hereinbefore and bent longitudinally in an arc of a circle so that its end portions make a right angle therebetween. Further, in the region of each crossing of two alignments of beams 2, the latter are connected by means of a hollow X-shaped connector 27 so as to permit the communication between the channels of the beams which cross each other.

This arrangement of the structure which supports the metal sheets of the covering 1 inside the pool, in a network of channels accessible from the exterior through the upper edges and optionally through the bottom of the pool, permits the introduction of a radiography device throughout the length of the inspection channels 20 and the piping for the leakage liquid drained by the beams, throughout the network.

By way of a modification, the structure of beams may, of course, form a plurality of networks which are independent from each other.

Such a beam 2 according to the invention permits, on one hand, radiographing the whole of the weld disposed on its bearing surface by means of the longitudinal inspection channel 20 having a closed cross-section, capable of receiving a suitable device, and, on the other hand, ensuring the draining of 100% of the leakages in the region of this weld owing to the presence of a longitudinal draining channel 21 provided on each side of the latter.

Moreover, this beam perfectly performs its supporting function for the sheets 6 by providing a flat bearing surface 14 on which the latter may bear, and transmit to the concrete of the corresponding wall, through the beam, the pressure forces exerted by the water of the pool and the shear forces due to thermal stresses.

Further, the presence of the flanges 11 of the first section element 16 advantageously increases the area of contact of the beam with the sheets while avoiding at the same time the piercing of the latter which would occur if they were directly applied against the end of straight branches.

The parts of the second embodiment of the invention shown in FIGS. 2 and 3, which are distinguished from those of the first embodiment illustrated in FIG. 1, will now be described, the similar parts of these two embodiments carrying the same reference characters.

Figure 2:
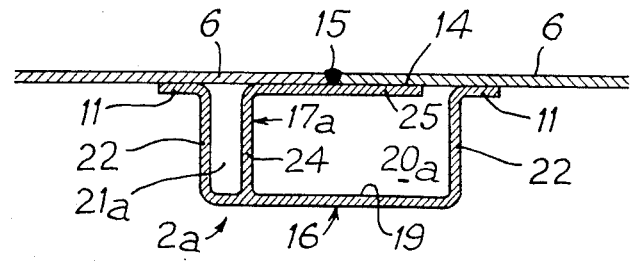
FIG. 2 is a diagrammatic cross-sectional view of a second embodiment of a beam according to the invention supporting two inner fluidtight covering metal sheets of a pool, these sheets being welded together.
Figure 3:
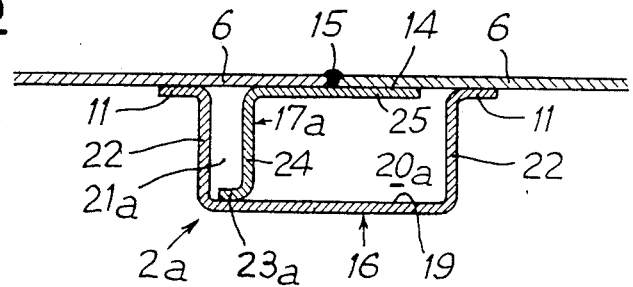
FIG. 3 is a view similar to FIG. 2 illustrating a modification of the second embodiment shown in FIG. 2.

The beam 2a shown in FIG. 2 is obtained directly by a cold drawing operation. This beam 2a differs from that previously described in that the second section element 17 is replaced by a second section element 17a which has in cross-section roughly the shape of an L and is in one piece with the first section element 17.

A branch 24 of this second section element 17a is rigid at one end with the bottom 19 of the first section element 16 and extends in facing relation to and in the vicinity of a branch 22 of the latter so as to define therewith a longitudinal draining channel 21a having a cross section which is open toward the metal sheets 6 of the fluidtight inner covering of a de-activation pool.

The other branch 25 of this L-section element extends transversely in a direction away from the draining channel 21a and defines a space between its free end and the corresponding branch 22 of the first section element 16, its surface facing toward said metal sheets 6 forming the bearing surface 14 of the latter on the beam 2a.

Thus, a longitudinal inspection and draining channel 20a having an open cross-section and capable of receiving a device for radiographing welds, is formed between the branch 22 of the first section element 16 opposed to the draining channel 21a, and the branch 24 of the second section element 17a fixed to the first section element.

By way of a modification (FIG. 3), the second section element 17a constructed separately from the first section element, includes a flange 23a which is welded to the bottom of the latter and extends in the draining channel 21a.

Apart from the interest of directly obtaining a beam by a cold drawing operation, this beam 2a is advantageously narrower than the beam 2 of the first embodiment of the invention for a given width allowed for the respective visiting channel.

What is claimed is:

1. A de-activation pool of a nuclear station, whose walls are provided with a fluid-tight covering of exterior metal sheets welded together by their edges by means of weld beads and supported under each weld bead by a beam in the region of a planar bearing surface of the beam, each beam being fixed in a corresponding wall of the pool; each beam being hollow and, each beam comprising a first section element having roughly the shape of a U in cross-section, the planar bearing surface extending longitudinally in facing relation to at least a part of the bottom of the first section element; and a member disposed inside the first section element and defining, with said first section element, said planar bearing surface and at least two longitudinal channels in the inner volume of the beam, said member having a first segment and a second substantially horizontal segment vertically spaced from said bottom of said first section element and forming part of said planar bearing surface, only one of said channels forming a weld-inspection channel, and at least one of said channels having an open cross-section and forming a draining channel, said channels being located so that said planar being surface is facing and opposite to said channels inside the beam.

2. A pool according to claim 1, wherein the U has two branches and said bottom, and wherein said planar bearing surface and the edges of the branches of the first section element are contained in a common plane.

3. A pool according to cliam 2, wherein the edge of the branches of the section elemtent each has a flange extending in a direction parallel to the bearing surface, outwardly of the beam, said flanges completing the bearing surface by their surface oriented toward the exterior of the beam.

4. A pool according to claim 2, wherein the bearing surface is spaced from each of the branches of the section element.

5. A de-activation pool of a nuclear station, whose walls are provided with a fluid-tight covering of exterior metal sheets welded together by their edges by means of weld beads and supported under each weld bead by a beam in the region of a planar bearing surface of the beam, each beam being fixed in a corresponding wall of the pool and comprising a first section element having roughly the shape of a U in cross-section, the planar bearing surface extending longitudinally in facing relation to at least a part of the bottom of the first section element, and a channel having an open cross-section, characterized in that each beam comprises a member disposed inside the first section element, said member defining, with said first section element, said planar bearing surface and at least two longitudinal channels in the inner volume of the beam;

wherein the U has two branches and said bottom, and
    wherein said planar bearing surface and the edges of the branches of the first section element are contained in a common plane;
  wherein the bearing surface is spaced from each of the branches of the section element; and wherein each beam comprises an inspection channel having a closed cross section, and two longitudinal draining channels having an open cross-section.

6. A pool according to claim 5, wherein the member disposed inside said first section element is a second section element which has in cross-section roughly the shape of a U having branches fixed to the bottom of the first section element and having a bottom, facing in a direction opposed to that of the bottom of said first section element, forming said bearing surface.

7. A pool according to claim 6, wherein the branches of the second section element each define a flange so that said second section element has, in cross-section, roughly the shape of an omega.

8. A pool according to claim 4, wherein each beam comprises two longitudinal channels having an open cross-section respectively forming an inspection and draining channel and a draining channel.

9. A de-activation pool of a nuclear station, whose walls are provided with a fluid-tight covering of exterior metal sheets welded together by their edges by means of weld beads and supported under each weld bead by a beam in the region of a planar bearing surface of the beam, each beam being fixed in a corresponding wall of the pool and comprising a first section element having roughly the shape of a U in cross-section, the planar bearing surface extending longitudinally in facing relation to at least a part of the bottom of the first section element, and a channel having an open cross-section, characterized in that each beam comprises a member disposed inside the first section element, said member defining, with said first section element, said planar bearing surface and at least two longitudinal channels in the inner volume of the beam;

wherein the U has two branches and said bottom, and wherein said planar bearing surface and the edges of the branches of the first section element are contained in a common plane;

wherein the bearing surface is spaced from each of the branches of the section element;

wherein each beam comprises two longitudinal channels having an open cross-section respectively forming an inspection and draining channel and a draining channel; and wherein the member disposed inside the first section element is a second section element which has, in cross-section, roughly the shape of an L having a first branch, fixed in a position perpendicular to the bottom of the first section element, and another branch whose surface faces in a direction away from said bottom and forms said bearing surface.

10. A pool according to claim 9, wherein the first branch (24) of the second section element (17a) is fixed to the bottom (19) of the first section element and has a flange (23a) which extends, in a direction opposed to that of said another branch (25), along the bottom (19) of the first section element.

11. A reservoir according to claim 9, wherein each beam is made from a single member by a cold drawing operation.

* * * * *